United States Patent [19]
Miyagi et al.

[11] Patent Number: 6,119,762
[45] Date of Patent: Sep. 19, 2000

[54] DEVICE FOR MANUFACTURING AN ELECTRODE PLATE ASSEMBLY FOR LEAD ACCUMULATOR

[75] Inventors: Rikio Miyagi; Kunio Makino, both of Kosai; Fumiaki Seta, Hirakata; Akitoshi Hiramatsu, Toyokawa, all of Japan

[73] Assignee: Matsushita Electric Industrial Co., Ltd., Osaka, Japan

[21] Appl. No.: 09/110,657

[22] Filed: Jul. 6, 1998

[30] Foreign Application Priority Data

Sep. 5, 1997 [JP] Japan .................................... 9-240547

[51] Int. Cl.[7] .............................. B22D 19/00; B22D 5/02; B22D 27/04
[52] U.S. Cl. .......................... 164/332; 164/326; 164/334; 164/338.1
[58] Field of Search ............................. 164/332, 80, 102, 164/103, 109, 112, 130, 326, 334, 338.1, DIG. 1

[56] References Cited

U.S. PATENT DOCUMENTS

| | | | |
|---|---|---|---|
| 4,534,401 | 8/1985 | Schaumburg | 164/102 |
| 5,776,207 | 7/1998 | Tsuchida et al. | 29/623.1 |
| 5,836,371 | 11/1998 | Kump | 164/80 |

FOREIGN PATENT DOCUMENTS

| | | |
|---|---|---|
| 5-3028 | 1/1993 | Japan . |
| 6-290770 | 10/1994 | Japan . |
| 8255608 | 10/1994 | Japan . |
| 8-255608 | 10/1996 | Japan . |

*Primary Examiner*—Harold Pyon
*Assistant Examiner*—I.-H. Lin
*Attorney, Agent, or Firm*—Jordan and Hamburg LLP

[57] ABSTRACT

A number of strap-forming metal molds 12 corresponding to the number of steps are arranged on a circumferential track and are fed to the devices of the respective steps A–F together with electrode plate groups 10. Position A is an electrode plate group 10 introduction position; position B is a flux coating position in which electrode plate leads 6 are coated with flux; position C is an auxiliary heating position in which a mold 8 is heated to the temperature of the molten lead; position D is a molten lead pouring position in which molten lead is poured into a mold 8; position E is a strap-forming position in which electrode plate leads 6 are inserted into the molten lead, fused and cooled and the molten lead is solidified; position F is a discharge position in which a completed electrode plate assembly is discharged. Heating of a mold 8 is commenced by inductive heating from position F and is continued to position E.

10 Claims, 10 Drawing Sheets

DEVICE FOR MANUFACTURING AN ELECTRODE PLATE ASSEMBLY FOR LEAD ACCUMULATOR

BACKGROUND OF THE INVENTION

1. Field of the Invention

The present invention relates to a method of manufacturing an electrode plate assembly for a lead accumulator and device therefor whereby an electrode plate assembly for a lead accumulator is manufactured by forming, by the cast-on strap method, a strap connecting electrode plates on an electrode plate group constituted by forming a plurality of electrode plates as a stack.

2. Description of the Related Art

As shown in FIG. 11, an electrode plate assembly of a lead accumulator is manufactured by continuously connecting electrode plate leads 6 by means of straps 2a, 2b, by forming respective straps 2a, 2b on the positive electrode plate side and negative electrode plate side on electrode plate leads 6 formed in projecting manner on each electrode plate 3 in an electrode plate group 10 in which there are alternately stacked a plurality of electrode plates 3 of positive and negative electrodes, with interposition of separators 5.

In the case of the electrode plate assembly shown in FIG. 11, an electrode pillar 4 is formed constituting a terminal electrode of an accumulator on a strap 2b and a connector 7 between cells for connecting electrode plate assemblies is adjacently connected to a strap 2a. As shown in FIG. 12, a plurality of thus-formed electrode plate assemblies are accommodated in the electrolyte tank 45 of a lead accumulator, a lead accumulator of the required output voltage being manufactured by effecting connection between straps 2a, 2b of the various electrode plate assemblies. The shape of these straps 2 (2a, 2b) is different depending on the type of lead accumulator and/or the position of their arrangement on the lead accumulator, so in the following description they will be referred to generally as straps 2, irrespective of changes in shape and/or positive/negative polarity. Also, for definiteness in the description given below, the condition in which a plurality of electrode plates 3 are stacked will be called an electrode plate group 10, while the condition in which straps 2 are formed on such an electrode group 10 will be called an electrode plate assembly 1.

FIG. 13 shows the construction of a prior art example of a device for forming a strap 2 on electrode plate group 10 by the cast-on method referred to above. Heaters 42 and cooling-water pipes 41 are provided, the construction being such that heating by means of heaters 42 and cooling by means of the cooling water can be changed over. Straps 2 are formed on electrode plate leads 6, which are inserted within recesses 43, using a large metal mold 40, which is formed with recesses 43 of the shape of straps 2 which are to be formed.

This large metal mold 40 is heated by heaters 42 to 120~150° C. and molten lead is poured into recesses 43, electrode plate leads 6 being inserted within recesses 43. At the point where the molten lead and the electrode plate leads 6 are welded, large metal mold 40 is changed over to cooling by cooling water. The molten lead that was poured in is thereby solidified, and on separating electrode plate group 10 from large metal mold 40, straps 2 are formed wherein the electrode plate leads 6 of electrode plate groups 10 are unitarily linked and joined.

Various proposals have been made in connection with the construction of this prior art example. In one of these (disclosed in Early Japanese Patent Publication No. H.6-290770 or Early Japanese Patent Publication No. H.8-255608), the aforesaid large metal mold 40 is reduced in size, within a range in which strap formation is possible, and the heating efficiency is raised by heating the mold by electromagnetic heating using an induction heating coil arranged at its periphery. In another of these (disclosed in Early Japanese Patent Publication No. H.5-3028), the metal mold is filled with a prescribed quantity of molten lead by immersing the metal mold in molten lead, and a step of cooling using air cooling is performed after insertion of the electrode plate leads therein, whilst the mold is circulated round a rotating table.

However, with the conventional method of manufacture using the cast-on strap system, when the electrode plate leads are inserted into the molten lead that has been poured into the metal mold, or when the molten lead is poured into the metal mold in which the electrode plate leads have been inserted, this produces an abrupt drop in the temperature of the molten lead and it is therefore necessary to raise the temperature of the molten lead in anticipation of this. As a result, lead oxide is liable to be produced, with the consequence that straps may be formed by molten lead containing impurity. Also, due to the sudden lowering of the temperature of the molten lead, welding with the electrode plate leads cannot be performed in a stable manner. Also, because the mold was large or because appropriate means for cooling when the molten lead was solidified were not adopted, the problems were experienced that straps were formed in which voids were produced or the cooling rate was slow, making it difficult to raise productivity.

SUMMARY OF THE INVENTION

The present invention has been devised in view of the above problems of the prior art, its object being to provide a method of manufacturing an electrode plate assembly and device therefor whereby a strap that is formed by the cast-on strap system is formed on the electrode plate group with high quality.

In order to achieve this object, a method of manufacturing an electrode plate assembly for a lead accumulator by forming a strap on an electrode plate group which is constituted by alternately stacking, with interposition of separators, a plurality of electrode plates of both positive and negative electrodes, comprises the steps of: pouring molten lead into a mold of strap shape; inserting a positive electrode row and negative electrode row respectively of electrode plate leads formed in a projecting manner on each electrode plate into the molten lead in the mold so that the electrode plate leads are fused with the molten lead; cooling the mold so that the molten lead is solidified, thereby forming the strap unitarily linking and joining the rows of electrode plate leads with respective positive and negative electrodes, wherein: the molds are arranged on a circumferential track in a number corresponding to the number of steps for forming the strap and are respectively provided with an electromagnetic induction coil and means for cooling; control is effected such that the molds are moved in forward feed to each said step together with the electrode plate group, the temperature of the molds being controlled to the optimum temperature in each step by said electromagnetic induction coil and means for cooling; and control is also effected such that heating of the mold is stopped after said molten lead is fused with the electrode plate leads, cooling then being performed by said means for cooling.

With the above method of manufacture, the strap-forming metal mold is provided with an electromagnetic induction coil so it can always be subjected to induction heating except when the molten lead is being cooled and solidified, and the strap-forming metal molds that are provided in a number corresponding to the number of steps on the circulating track are moved sequentially, the molds being heated to the necessary temperature for fusion by the time of the step of pouring molten lead into the mold and the step of welding the electrode plate leads, and a strap is then formed on the electrode plate group by subsequent rapid cooling and solidification of the molten lead by the means for cooling. Manufacture of the electrode plate assembly can thus be performed efficiently by circulating the strap-forming metal molds and electrode plate groups on the circulatory track.

With the above method of manufacture, by heating control such that the mold is subjected to pre-heating to the temperature of the molten lead prior to pouring of the molten lead, temperature of the molten lead poured into the mold does not drop. If heating is not performed, it is necessary to raise the temperature of the molten lead to a high temperature in anticipation of the temperature drop, so production of a large quantity of lead oxide etc. is unavoidable, with the result that the strap is formed by molten lead in which impurities are admixed. However, by raising the mold temperature in this way, molten lead can be employed that is at the temperature necessary for welding, so there is little admixture of lead oxides etc., and the strap can therefore be formed by lead of high quality.

A device for manufacturing an electrode plate assembly for a lead accumulator according to the present invention in which an electrode plate group is formed by alternately stacking, with interposition of separators, a plurality of electrode plates of both positive and negative electrodes, a positive electrode row and negative electrode row respectively of electrode plate leads formed in projecting manner on each electrode plate being inserted in molten lead that is poured into a mold of strap shape, so that the electrode plate leads are fused with the molten lead, an electrode plate assembly then being manufactured by unitarily linking and joining the rows of electrode plate leads with respective positive and negative electrodes by means of a strap formed by the molten lead solidified by cooling the mold, comprises: a strap-forming metal mold constituted by providing said mold with an electromagnetic induction coil and means for cooling; means for raising and lowering the electrode plate group that effects raising and lowering movement over the strap-forming metal mold, holding said electrode plate group; circulatory drive means wherein these strap-forming metal mold and means for raising and lowering the electrode plate group are arranged along a circumferential track, being mounted in a number corresponding to the number of steps for forming the strap on the electrode plate group, and are circulated in forward-feed manner to each step; and means for control that controls the induction heating by said electromagnetic induction coil and cooling by the means for cooling in accordance with temperature detection of said mold and that controls the action of said means for circulatory drive and the various devices in each step.

With the above construction, the means for circulatory drive carries the strap-forming metal molds and means for raising and lowering the electrode plate groups in paired fashion, and these are sequentially moved to each step arranged along the circulatory track. The mold that is equipped in the strap-forming metal mold is induction-heated by the electromagnetic induction coil, and its temperature is controlled by the means for control such that it is preheated to the temperature of the molten lead by the time the step is reached in which the molten lead is poured into the mold. As a result of this, no temperature drop is experienced by the molten lead. In the welding step, heating is continued even when the electrode plate leads are inserted into the molten lead by lowering the electrode plate group by the means for electrode plate raising and lowering. As a result, the electrode plate leads can be brought into fused condition with the molten lead in a short time. Subsequently, the mold is cooled by the means for cooling, so the strap linking and joining the electrode plate leads is formed by solidification of the molten lead. With the formation of the strap on to this electrode plate group, the electrode plate assembly is completed by performance of a single circuit of the sequential movement of the strap-forming metal molds and the electrode plate groups held by the means for raising and lowering the electrode plate groups along the circulatory track.

With a strap-forming metal mold according to the above construction, by a construction whereby downwardly directed cooling fins are formed on the bottom face of the mold, and means for cooling is arranged surrounded by these cooling fins, the electromagnetic induction coil being arranged at the periphery of the mold outside the cooling fins, the cooling effect when cooling water from the means for cooling is sprayed on to the cooling fins and the mold is increased, and the production rhythm is improved. Also, due to the downwardly-directed formation of the cooling fins, they easily throw off the cooling water, thereby enabling any lowering of heating effect due to water remaining behind when heating is performed after cooling to be prevented. Furthermore, cooling water cannot adhere to the electromagnetic induction coil, since this is arranged outside, separated by the cooling fins.

Also, since cooling of the molten lead is effected from the bottom of the mold by dispersing cooling water over a wide range at the bottom of the mold by the means for cooling being formed by shower nozzles that disperse and spray cooling water on to the mold and the cooling fins formed on the mold, solidification of the molten lead proceeds from below in the upwards direction, and there is no possibility of hollows such as voids being formed within the strap.

Furthermore, by forming the mold of shape of small thickness using a metallic material of large electromagnetic induction skin effect, and covering at least the inside face of the mold with material of good thermal conductivity, induction heating is performed efficiently by the metallic material of large skin resistance and the resistance heating is efficiently effected by dispensing with unnecessary thick portions that do not contribute to the skin effect, and thermal conductivity is also improved. Also, by covering the inner surface of the mold with a material of good thermal conductivity, the interior of the mold can be heated to a uniform temperature, thanks to the improved thermal conductivity. Improving the thermal conductivity is also associated with a shortening of the cooling period when cooling.

Furthermore, the mold may be formed of a laminated structure of 430 stainless steel and material of good thermal conductivity. In this way, by adding the effect of the good thermal conductivity to the highly efficient conductive heating achieved by the use of 430 stainless steel of large skin resistance, efficient and uniform heating of the mold can be achieved.

Furthermore, temperature adjustment of the individual molds is facilitated by the adoption of a construction in which a radio frequency power source that supplies inductive heating power to the electromagnetic induction coil is provided for each strap-forming metal mold.

Furthermore, although it is difficult to supply large current at low voltage applied to the electromagnetic induction coil of the strap-forming metal mold moving along the circulatory track by sliding contact, by making the power source power supply to the radio frequency power source of comparatively high voltage, supply can be achieved at low current. In this way, a construction can easily be achieved in which power supply is effected to the individual strap-forming metal molds whilst they are moving.

Furthermore, by providing temperature sensors in the strap-forming molds and adopting a construction whereby the radio frequency power that is supplied to the electromagnetic induction coil is controlled in accordance with the detected value of this temperature sensor, the temperature of the individual molds arranged on the circulatory track can be individually controlled, thereby making it possible to adjust the temperature in the individual steps to an optimum condition.

Furthermore, by adopting a construction in which means for auxiliary heating applies auxiliary heating to the mold prior to the pouring of molten lead into the mold, a rapid rise of the temperature of the mold to the temperature of the molten lead can be achieved. As a result, there is no drop in the temperature of the molten lead when it is poured into the mold, so fusion on insertion of the electrode plates into the molten lead can be achieved in a reliable and stable manner.

Furthermore, by the adoption of an electromagnetic induction coil as the means for auxiliary heating arranged in the vicinity of the mold prior to pouring of molten lead into the mold, inductive heating by the electromagnetic induction coil for auxiliary heating is added to the electromagnetic induction coil arranged at the mold, thereby enabling the temperature of the mold to be rapidly raised to the temperature of the molten lead.

Furthermore, by constituting the means for auxiliary heating by a burner arranged in the vicinity of the mold prior to pouring of the molten lead into the mold, direct heating by the burner is added to the inductive heating performed by the electromagnetic induction coil arranged at the mold, thereby enabling the temperature of the mold to be raised rapidly to the temperature of the molten lead.

Furthermore, by constituting the means for auxiliary heating by a heating device arranged in the vicinity of the mold prior to pouring of the molten lead into the mold, heating by the heating device, which may consist of a heater and/or hot air current radiation, or infrared radiation is added to the inductive heating produced by the electromagnetic induction coil arranged at the mold, thereby enabling rapid temperature rise of the mold to the temperature of the molten lead to be achieved.

DESCRIPTION OF THE PREFERRED EMBODIMENTS

An embodiment of the present invention is described below with reference to the appended drawings, provided for the purpose of understanding the present invention. Elements which are common to the prior art construction are given the same reference symbols, and further description thereof is omitted.

Figure 1:
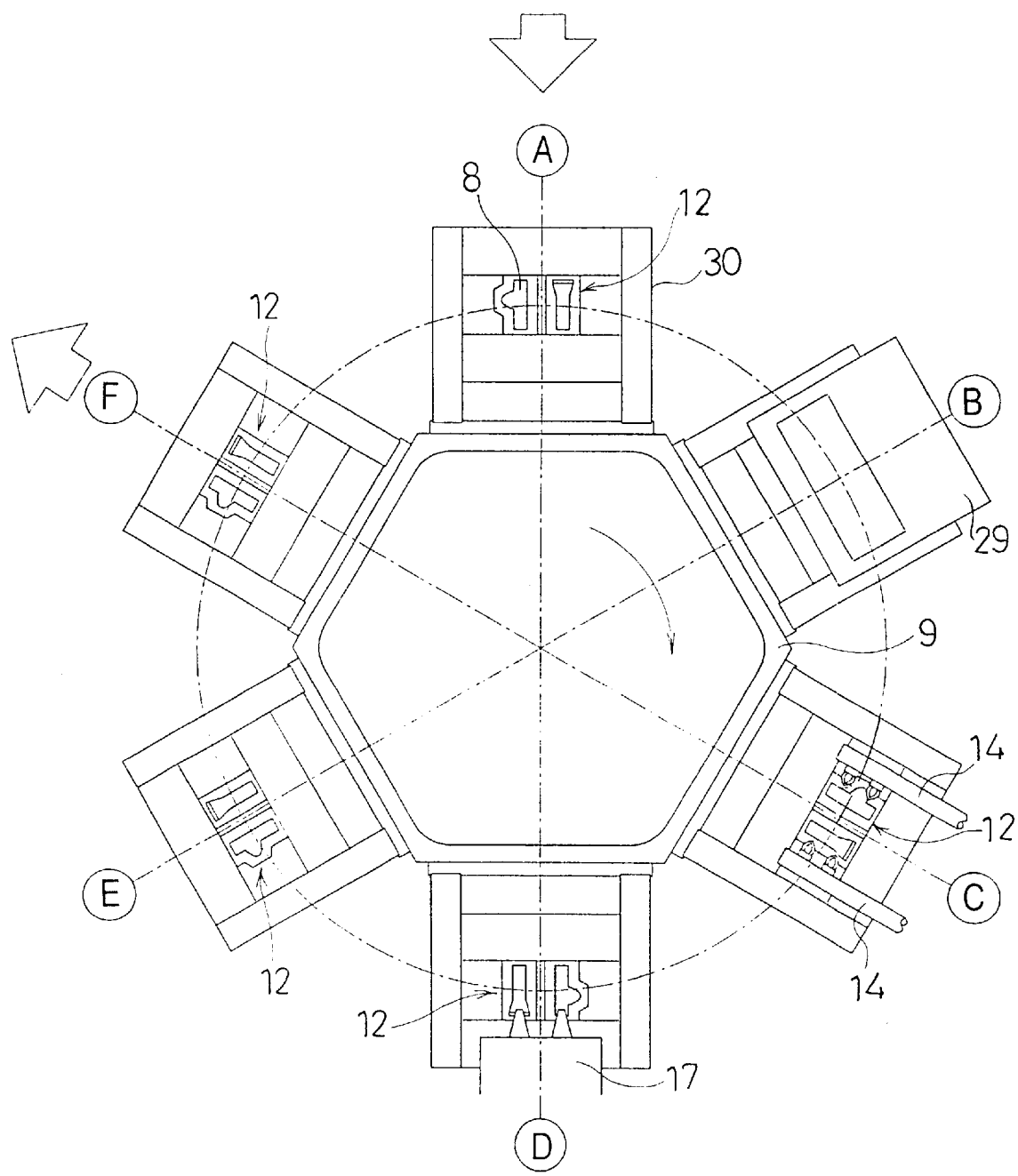
FIG. 1 is a plan view showing the construction for moving a strap-forming metal mold to each step in a device for manufacturing an electrode plate assembly according to an embodiment of the present invention.

In a device for manufacturing an electrode plate group unit according to an embodiment of the present invention, FIG. 1 is a plan view showing a construction whereby a strap-forming metal mold 12 is moved sequentially in each step by a circumferential track. At position A, electrode plate group 10 that is being conveyed within the device is made to circulate clockwise in the order A~F. Straps 2 are meanwhile formed on electrode plate group 10 by the cast-on strap system, thereby enabling an electrode plate assembly 1 to be manufactured.

At the peripheral face of rotary plate (rotary drive means) 9 that is driven in rotation in forward feed in the sequence A~F in a set prescribed time interval, metal mold cases 30 that hold strap-forming metal molds 12 are arranged at equal intervals in six locations and these are moved in forward-feed to the positions A~F by rotation of said rotary table 9, respectively. Of the positions A~F, position A is an introduction position where electrode plate group 10 is introduced into the device, position B is a flux application position where flux is applied to electrode plate lead 6 of electrode plate group 10, position C is an auxiliary heating position where a mold 8 in strap-forming metal mold 12 is heated by burner 14, position D is a molten lead supply position where molten lead is poured into the aforesaid mold 8 from molten lead discharge nozzle 17, position E is a strap-forming position where straps 2 are formed by inserting electrode plate lead 6 of electrode plate group 10 into mold 8, where they are fused with the molten lead and cooled, and position F is a delivery position where electrode plate assembly 1 formed with straps 2 is delivered from within the device.

Figure 2:
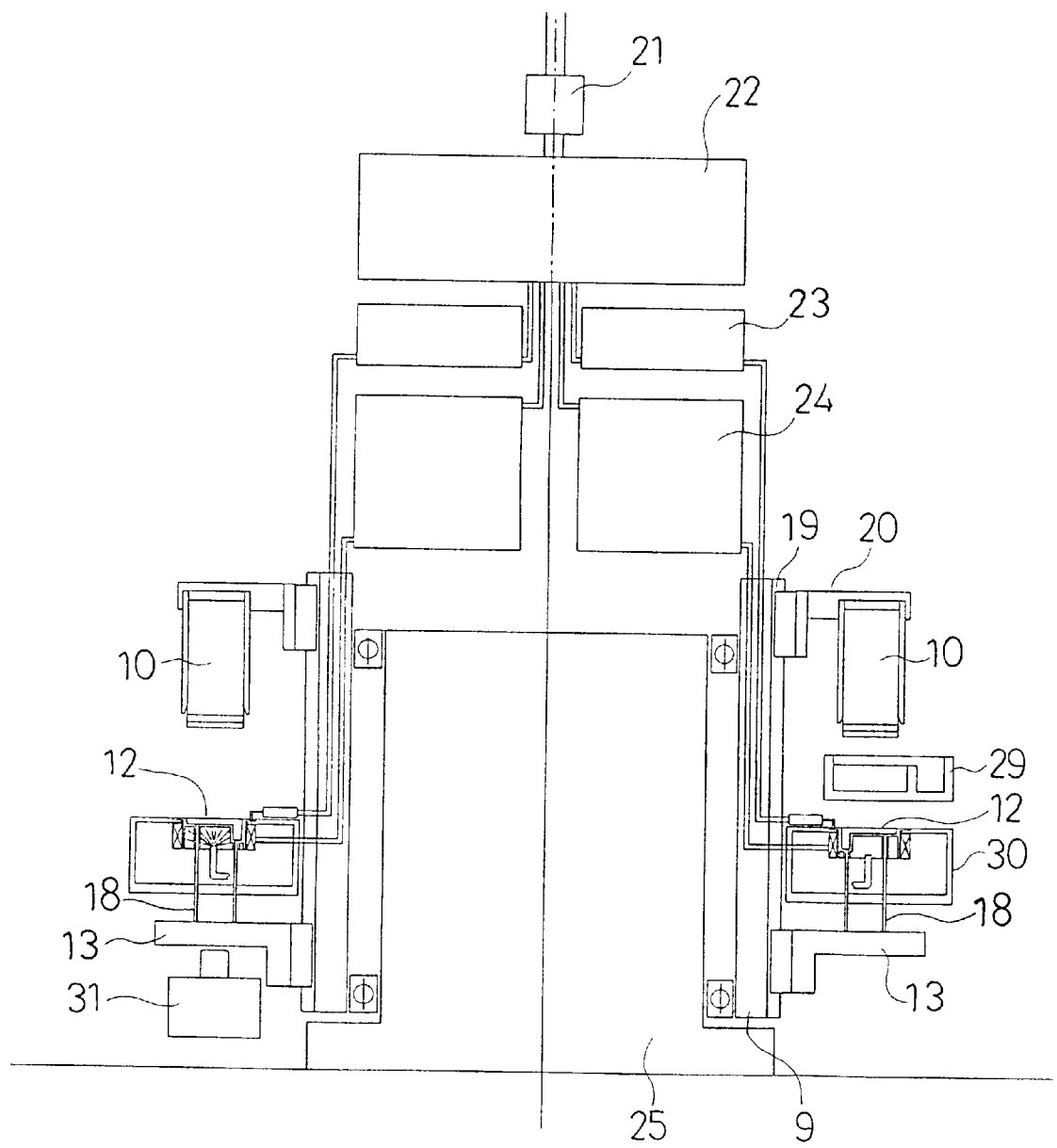
FIG. 2 is a cross-sectional view showing the layout in the vertical direction by a cross-section at the position B-E of FIG. 1.

FIG. 2 shows the layout in the vertical direction of the various structural elements of the device in cross-section of position B-position E shown in FIG. 1. From above the arrangement position, there are provided slip ring 21, sequencer (control means) 22, temperature adjuster 23, and radio frequency power source 24. Six of the aforesaid temperature adjusters 23 and radio frequency power sources 24 are respectively arranged corresponding to each strap-forming metal mold 12 such that operating control can be performed corresponding to the condition when strap-forming metal molds 12 arranged in the six locations are respectively moved into step positions A~F. Slip ring 21 maintains electrical connection in respect of the rotating sequencers 22, temperature adjusters 23, and radio frequency power sources 24 mounted on rotary table 9 that is driven in rotation by rotary drive unit 25.

Electrode plate group 10 that is introduced into the device in position A is held in inverted condition with the electrode plate leads 6 facing downwards on an electrode plate group holding arm (electrode plate group raising/lowering means) 20 that is supported in such a way that it can be freely raised or lowered on a raising/lowering rail 19 provided in the vertical direction of rotary table 9. It is constructed such that raising/lowering movement can be achieved by the aforesaid electrode plate group holding arm 20, whose amount of raising/lowering movement is controlled by sequencer 22 in each of the positions A~F. The raised position is maintained, as shown in FIG. 2, when introduction is effected at position A.

Figure 3:
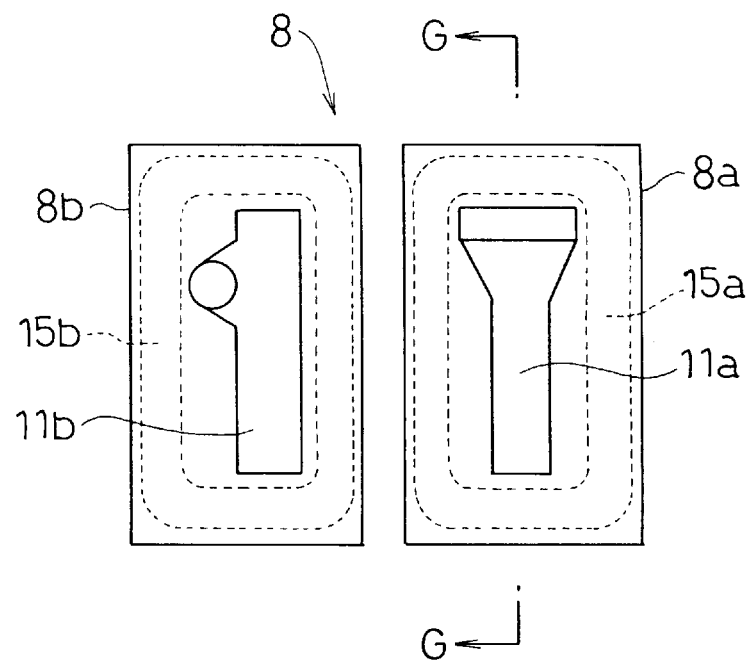
FIG. 3 is a plan view showing an example of the construction of a mold.
Figure 4:
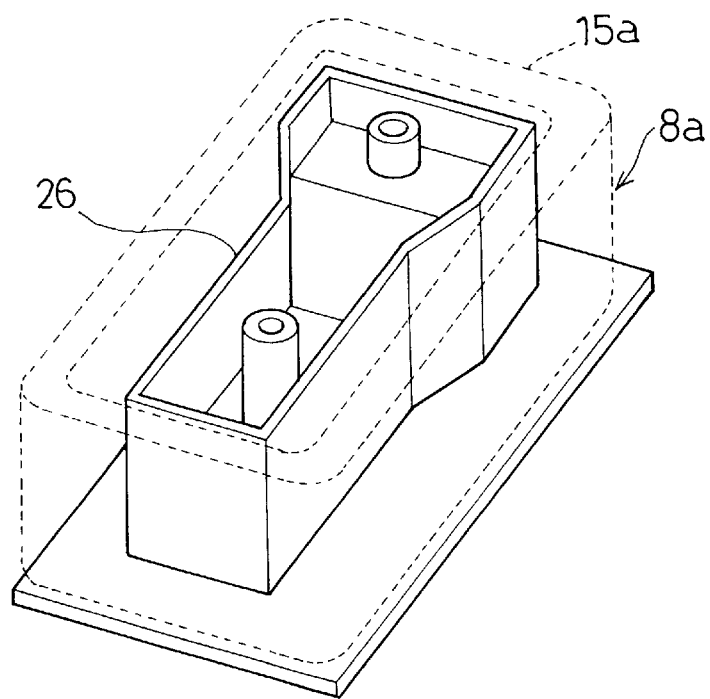
FIG. 4 is a perspective view showing a construction of the bottom face of a mold.

As shown in FIG. 3, in strap-forming metal molds 12, a mold 8a that is provided with a recess 11a for forming the positive electrode side strap 2a that effects linkage of the positive electrode side row of electrode plate leads 6 of electrode plate group 10, and mold 8b provided with a recess 11b for forming strap 2b on the negative electrode side where the negative electrode side row of electrode plate leads 6 is linked are arranged at the strap-forming interval on electrode plate group 10, and respective electromagnetic induction coils 15a, 15b are arranged at the periphery of the respective recesses 11a, 11b. FIG. 4 is a perspective view of mold 8a seen from the inner side. Cooling fins 26 of prescribed height are formed along the shape of recess 11a and the electromagnetic conduction coil 15a is arranged on the outside of this.

Regarding the shape of straps 2, of which a pair are formed on the positive electrode side and negative electrode side, the shape of the straps 2 will be different depending on the specification of the lead accumulator or position of arrangement of electrode plate group 10 when electrode plate group 10 is taken as one cell and a plurality thereof are assembled to constitute a lead accumulator, so the shape of recesses 11a, 11b shown in FIG. 3 is merely an example. In FIG. 3, there are two molds 8a, 8b for forming a pair of straps 2, these being distinguished by adding the suffixes a, b, since the shapes of the respective recesses 11a, 11b are different. However, in the subsequent description, now that this has been established, the description will be given without adding distinguishing symbols to the two molds 8a and 8b and the various structural elements associated therewith.

Figure 5:
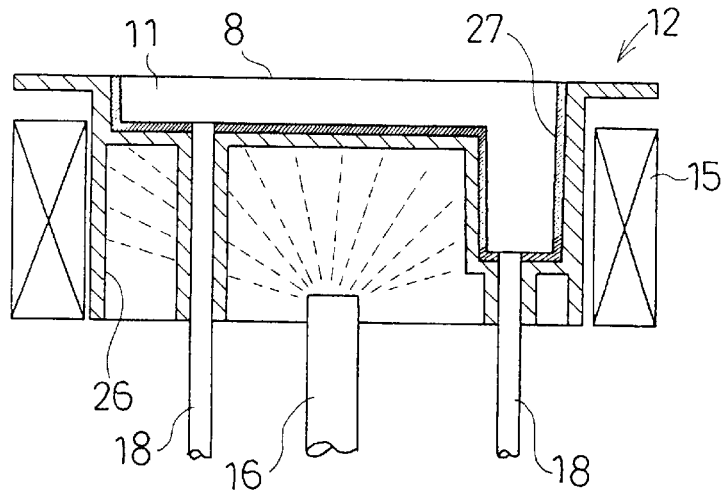
FIG. 5 is a cross-sectional view showing the construction of a strap-forming metal mold.

FIG. 5 shows the construction of strap-forming metal mold 12, and corresponds to a cross-section seen along the arrow G-G of FIG. 3. A joining metal layer 27 is provided on the wall face of recess 11 formed in the shape of straps 2 of mold 8. On the outside of cooling fins 26, there is provided an electromagnetic induction coil 15 for heating, at the bottom; there is provided a shower nozzle 16 for dispersing and discharging cooling water, and within recess 11 there are provided extrusion pins 18, 18 for extruding solidified molten lead, respectively.

Mold 8 is formed by 430 stainless steel which is adapted for inductive heating by electromagnetic inductive coil 15. Joining metal layer 27 provided on recess 11 is formed by plating or cladding copper, aluminium, or brass. As is well known, inductive heating makes use of the Joule heat generated by the resistance of a conductor by eddy currents generated in the conductor when this is arranged in an alternating magnetic field. When the radio frequency power for generating this alternating magnetic field is supplied to the electromagnetic induction coil 15, due to the skin effect whereby eddy currents are increasingly concentrated in the surface of the conductor as the frequency of the supplied power becomes higher, the heating effect is raised if the material of mold 8, which constitutes the subject of heating, is formed with a large skin resistance. As materials whose skin resistance is large, iron-based materials are often used. In the case of mold 8 according to the present embodiment, improvement in heating efficiency is obtained by using 430 stainless steel (18-0), which has a much larger skin resistance than other iron-based materials. However, since the thermal conductivity of iron-based materials is poor, in order to improve production efficiency, it is necessary to arrange that the interior of recess 11 is rapidly heated to a uniform temperature. Accordingly, rapidity and uniformity of heating of the interior of recess 11 are promoted by providing within recess 11 a material of excellent thermal conductivity as this joining metal layer 27. It should be noted that it would also be possible to form the whole of mold 8 as a laminated structure by using a material wherein two or more layers are joined by means such as cladding of 430 stainless steel and copper or similar material.

Also, in mold 8, as well as it being necessary that this should be rapidly heated, it is necessary, in order to raise production efficiency, that the molten lead that has been poured into the recess 11 should be rapidly cooled after it has fused with the electrode plate leads 6, such that electrode plate group 10 can be extracted with straps 2 formed. As a means of cooling this mold 8, there is provided a shower nozzle 16 that sprays cooling water whilst surrounded by cooling fins 26. The cooling water that is sprayed from this shower nozzle 16 is distributed everywhere over cooling fins 26 from the bottom face of mold 8, so mold 8 is cooled from this bottom face, and formation of straps 2 is achieved without generation of voids which are created by gaseous bubbles of flux combustion gas etc. left behind in the solidifying lead. Also, since the cooling water that is sprayed from shower nozzle 16 is distributed whilst being screened by cooling fins 26, adhesion of water to electromagnetic induction coil 15 is avoided. Furthermore, mold 8 is inductively heated once more by electromagnetic induction coil 15 ready for the next strap formation after the molten lead has solidified and been extracted in the form of straps 2, and, thanks to the construction of cooling fins 26 that are formed directly downwards, the sprayed cooling water can flow rapidly downwards, the downwards direction being open, so there is no possibility of cooling water being left behind to lower heating efficiency.

Figure 6:
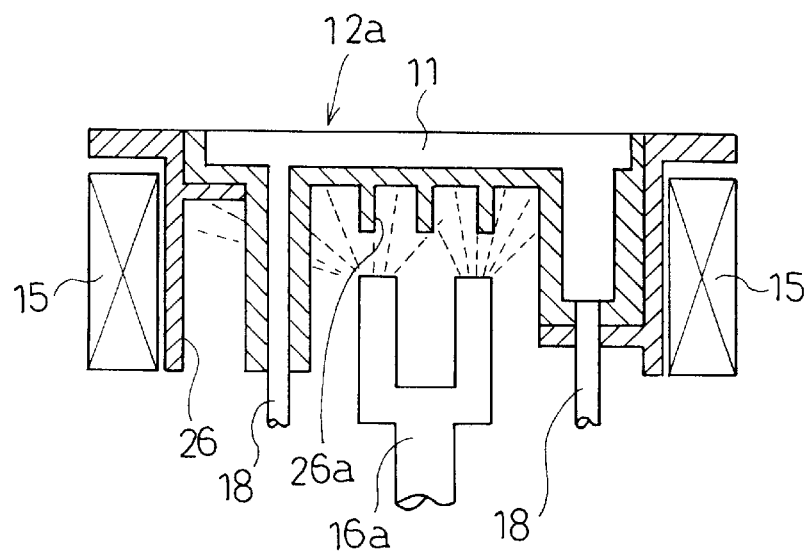
FIG. 6 is a cross-sectional view showing another construction of a strap-forming metal mold.

Strap forming metal mold 12 could also be constituted as shown in FIG. 6. In this construction, the peripheral portion facing electromagnetic induction coil 15 is formed of 430 stainless steel, while the inside face and central portion of mold 8 are formed of material of excellent thermal conductivity, such as copper, brass or aluminium. Furthermore, in order to increase the cooling rate, cooling fins 26a are provided and a shower nozzle 16a with increased cooling water spray apertures is provided. With this construction, thermal conductivity is improved, so the efficiency of heating and cooling are improved, enabling productivity to be raised.

The procedure for manufacturing an electrode plate assembly 1 using an electrode plate assembly manufacturing device of the above construction will now be explained with reference to FIG. 1~FIG. 5. The operations to be performed in the steps of the procedure described below in which an electrode plate group 10 that is introduced into the device in the position A shown in FIG. 1 is formed with straps 2, until it is fed out of the device as an electrode plate assembly 1 from position F are achieved by a sequencer 22 that controls the various structural elements in accordance with a pre-set control program.

An electrode plate group 10 that is supplied by a feed device, not shown, in position A, is introduced into the device and is held by an electrode plate group holding arm 20.

Moving to position B, coating the electrode plate leads 6 of electrode plate group 10 with flux is achieved by an operation whereby the electrode plate leads 6 projecting downwards from electrode plate group 10 are immersed in flux stored in a flux tank 29 arranged at position B by downward movement of electrode plate group holding arm 20, followed by lifting from flux tank 29 by raising of electrode plate group holding arm 20. In this way, welding in the molten lead is effected in a rapid and stable manner by removal of the oxide coating of the surface of electrode plate leads 6 on insertion into the molten lead, thanks to the flux applied to electrode plate leads 6.

In position C, auxiliary heating is performed by mold 8 being heated by burners 14 arranged at position C, until mold 8 reaches the temperature of the molten lead, before the molten lead is poured in at position D. Although molds 8 can be subjected to induction heating by application of radio frequency supplied from radio frequency power source 24 from an arbitrary position by electromagnetic induction coils 15 provided on each strap-forming metal mold 12, if the metal mold temperature detected by the temperature sensor (thermocouple) embedded in each mold 8 does not reach the prescribed temperature, the waiting time that would be required for raising the mold temperature can be eliminated by auxiliary heating performed by these burners 14, thereby enabling the rate of forward feed of rotary table 9 to be speeded up and the production rhythm to be improved. The heating by electromagnetic induction coil 15 can be arranged to commence immediately after the formation of straps 2 on electrode plate group 10 by cooling metal mold 12 at position E.

In position D, a prescribed amount of molten lead is poured from molten lead discharge nozzle 17 into mold 8 which has been sufficiently heated until it reaches the temperature of the molten lead. Since mold 8 is heated to the temperature of the molten lead, the molten lead that is poured in does not experience a temperature drop, and it is maintained at the prescribed temperature by heating performed by electromagnetic induction coil 15.

In position E, electrode plate leads 6 are inserted into mold 8 by lowering of electrode plate group 10 that is held by electrode plate group holding arm 20, so that the surface of electrode plate leads 6, which are covered with flux, is melted and fused with the molten lead by contact with the molten lead. After these electrode plate leads 6 have been fused with the molten lead, heating by means of electromagnetic induction coil 15 is stopped and mold 8 is cooled by spraying of cooling water from shower nozzle 16, solidifying the molten lead integrally with electrode plate leads 6. Next, extrusion pins 18 are advanced into mold 8 from the bottom of mold 8 by driving extrusion pin raising/lowering base 13 upwards by means of cylinder 31 (see FIG. 2) with the timing at which the molten lead is solidified and simultaneously electrode plate group 10 is raised by electrode plate group holding arm 20. Straps 2 formed by solidification of the molten lead are thereby extruded, straps 2 being formed on electrode plate group 10.

At position F, electrode plate assembly 1 that has been completed by formation of straps 2 on electrode plate group 10 is delivered to outside the device. Also, in order to repeat the above manufacturing steps by returning once more to position A, heating of mold 8 is commenced by means of electromagnetic induction coil 15 so as to raise the temperature of mold 8 that was cooled in position E.

Figure 7:
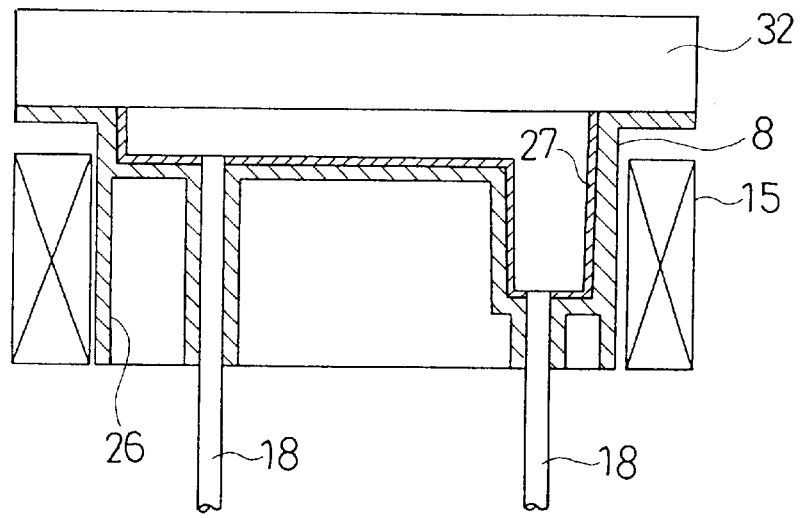
FIG. 7 is a cross-sectional view showing how means for auxiliary heating using a heating device are employed.
Figure 8:
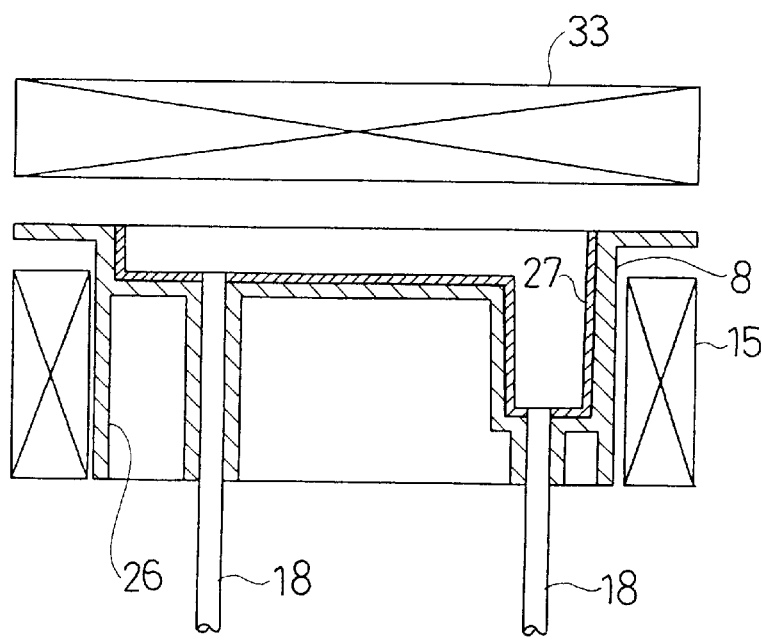
FIG. 8 is a cross-sectional view showing how means for auxiliary heating using induction heating are employed.
Figure 9:
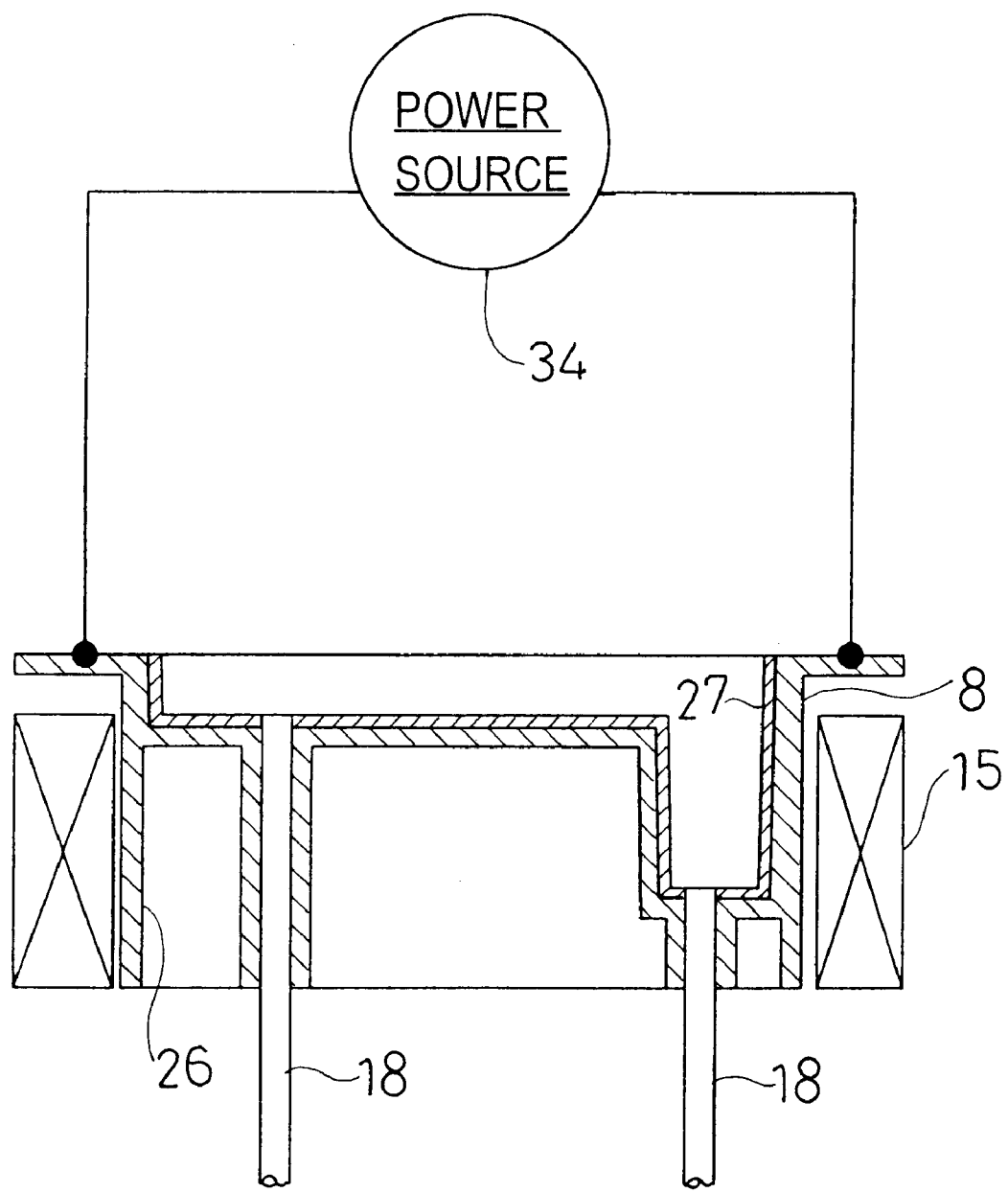
FIG. 9 is a cross-sectional view showing how means for auxiliary heating using direct resistance heating are employed.

In the above manufacturing process, a burner 14 was employed for the auxiliary heating of mold 8 at position C, but, as shown in FIG. 7, it would be possible to perform auxiliary heating of mold 8 by means of a heating device 32, by lowering a heating device 32 comprising a heater or injection of hot air etc. arranged at position C on to mold 8. Also, as shown in FIG. 8, it would be possible to perform auxiliary heating of mold 8 by means of an auxiliary electromagnetic induction coil 33 for auxiliary heating arranged at position C. Also, as shown in FIG. 9, it would be possible to perform direct resistance heating by utilising the electrical resistance possessed by mold 8, by passing a comparatively large current by connecting a power source 34 to both ends of mold 8.

Figure 10A:
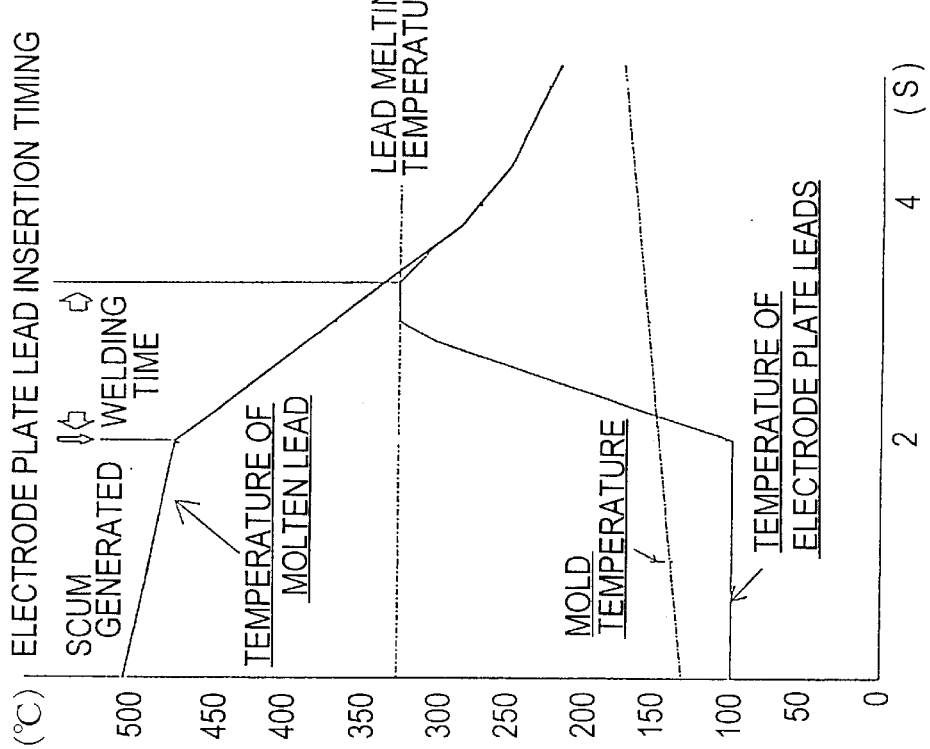
FIGS. 10A and 10B are a graph showing the temperature change on electrode plate lead welding with a prior art arrangement.
Figure 13:
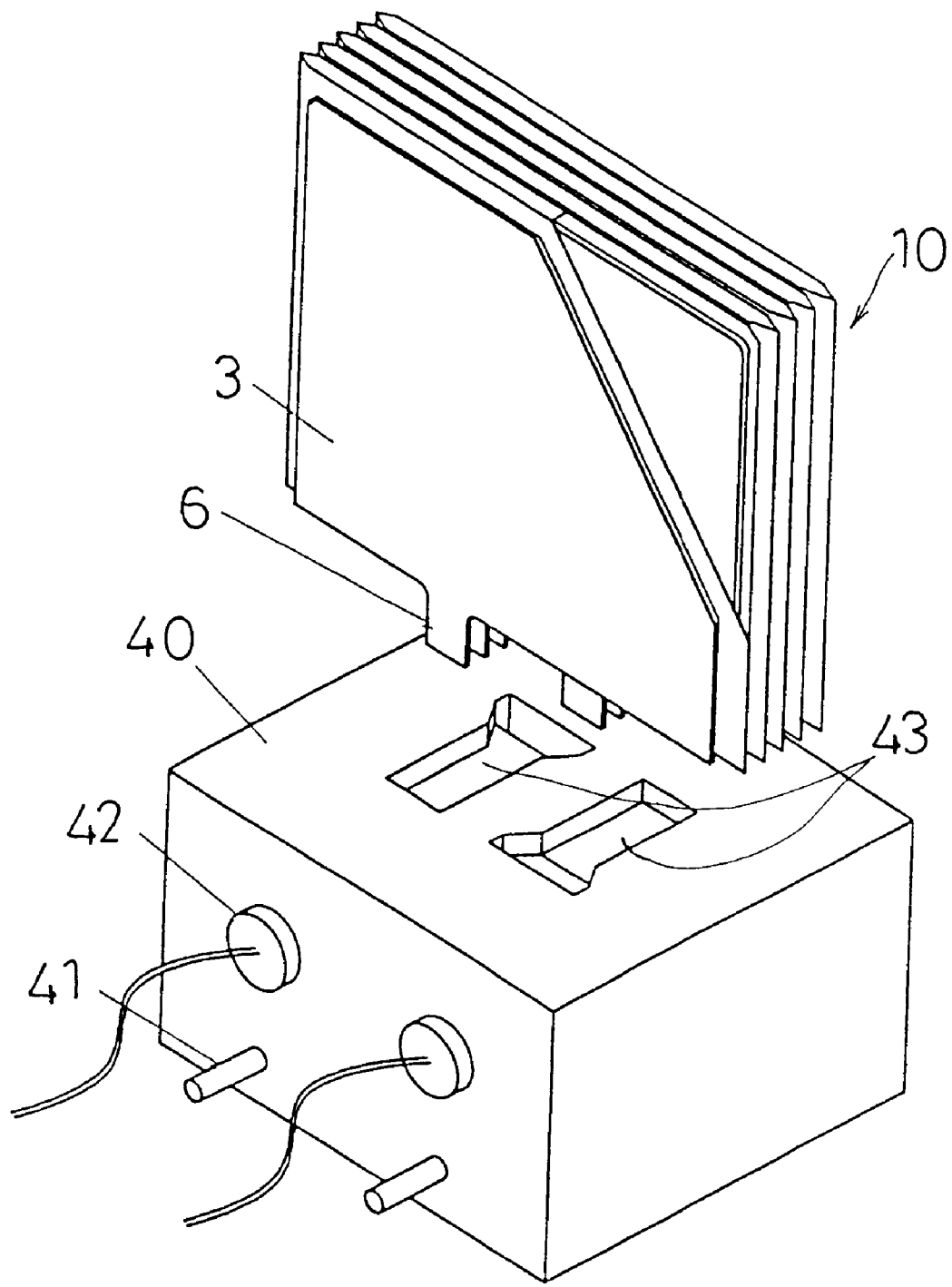
FIG. 13 is a perspective view showing the construction of strap formation in a cast-on strap system according to the prior art.

By assisting the heating performed by electromagnetic induction coil 15 by these auxiliary heating means, the temperature of the mold 8 can be raised to the temperature of the molten lead that is poured into it at position D, enabling the temperature of the molten lead to be maintained until the electrode plate leads 6 are inserted into the molten lead in mold 8 at position E. FIG. 10A shows a comparison of the condition of temperature change of the various parts when fusing is performed by insertion of electrode plate leads 6 into the molten lead in position E with the condition 10B on welding with the conventional device shown in FIG. 13. This shows the effective action of the auxiliary heating produced by the auxiliary heating means and the heat produced by electromagnetic induction coil 15.

As shown in FIG. 10A, since the temperature of the molten lead is kept to the low temperature of no more than 400° C. and the temperature of mold 8 is raised by the auxiliary heating to the temperature of the molten lead, there is no drop in the temperature of the molten lead that is poured into mold 8. In this condition, insertion of electrode plate leads 6 into mold 8 causes little drop in temperature and, since continuous temperature adjustment is effected by electromagnetic induction coil 15, electrode plate leads 6 are rapidly fused by the molten lead. This fusion time can be freely set, depending on conditions, with a maximum of 3 seconds. After this fusion time has passed, heating by electromagnetic induction coil 15 is stopped, and the electrode plate leads 6 and molten lead are solidified by rapidly lowering the temperature of mold 8 by spraying on cooling water from shower nozzle 6.

Figure 10B:
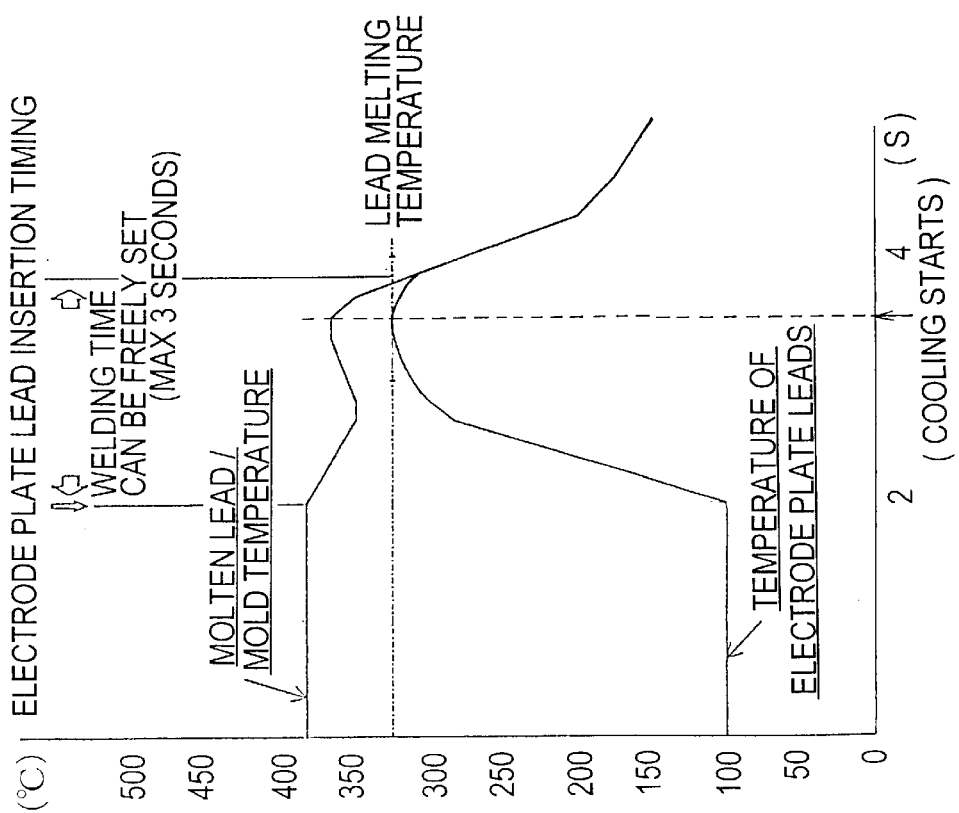
Figure 11:
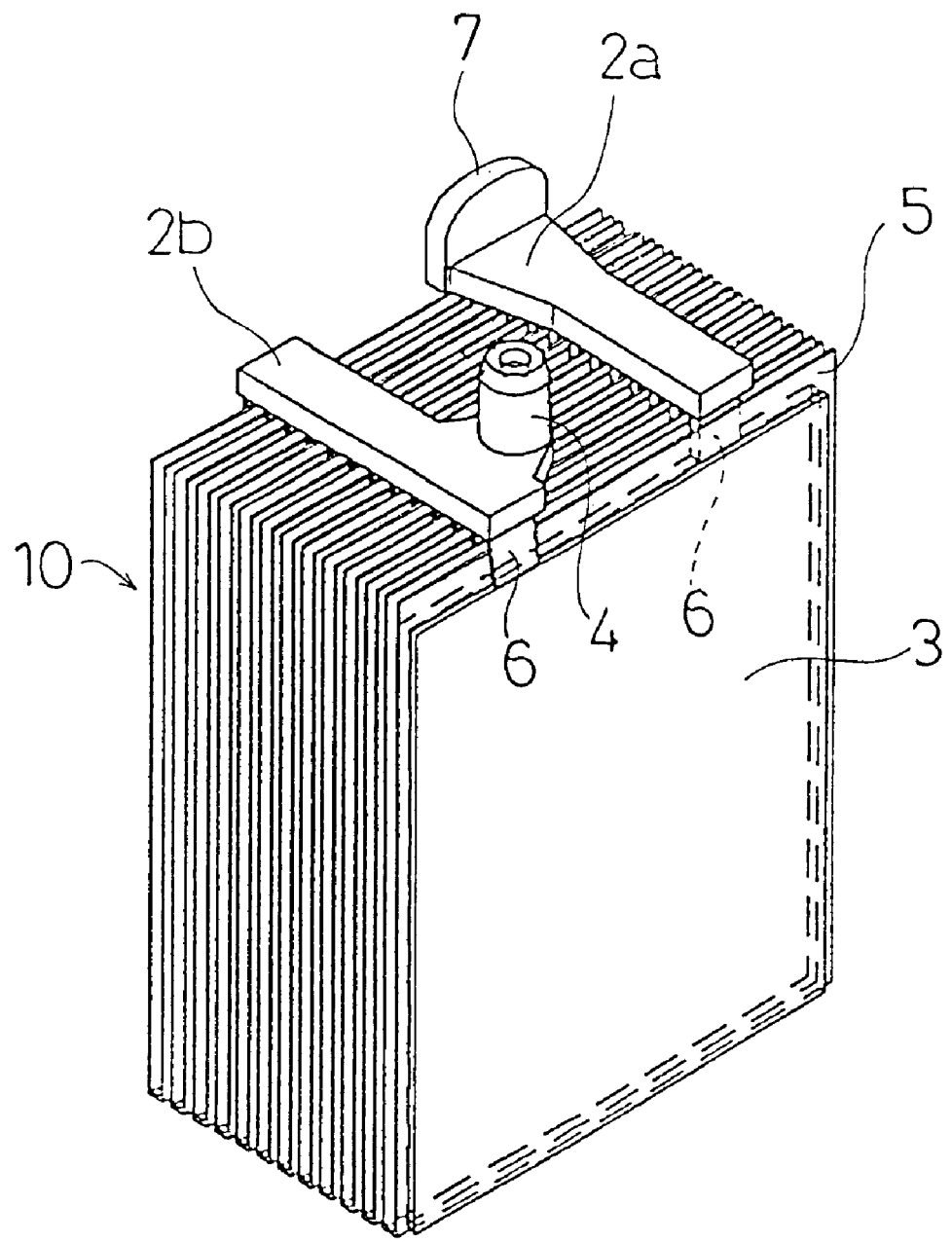
FIG. 11 is a perspective view showing an example of the construction of an electrode plate assembly.
Figure 12:
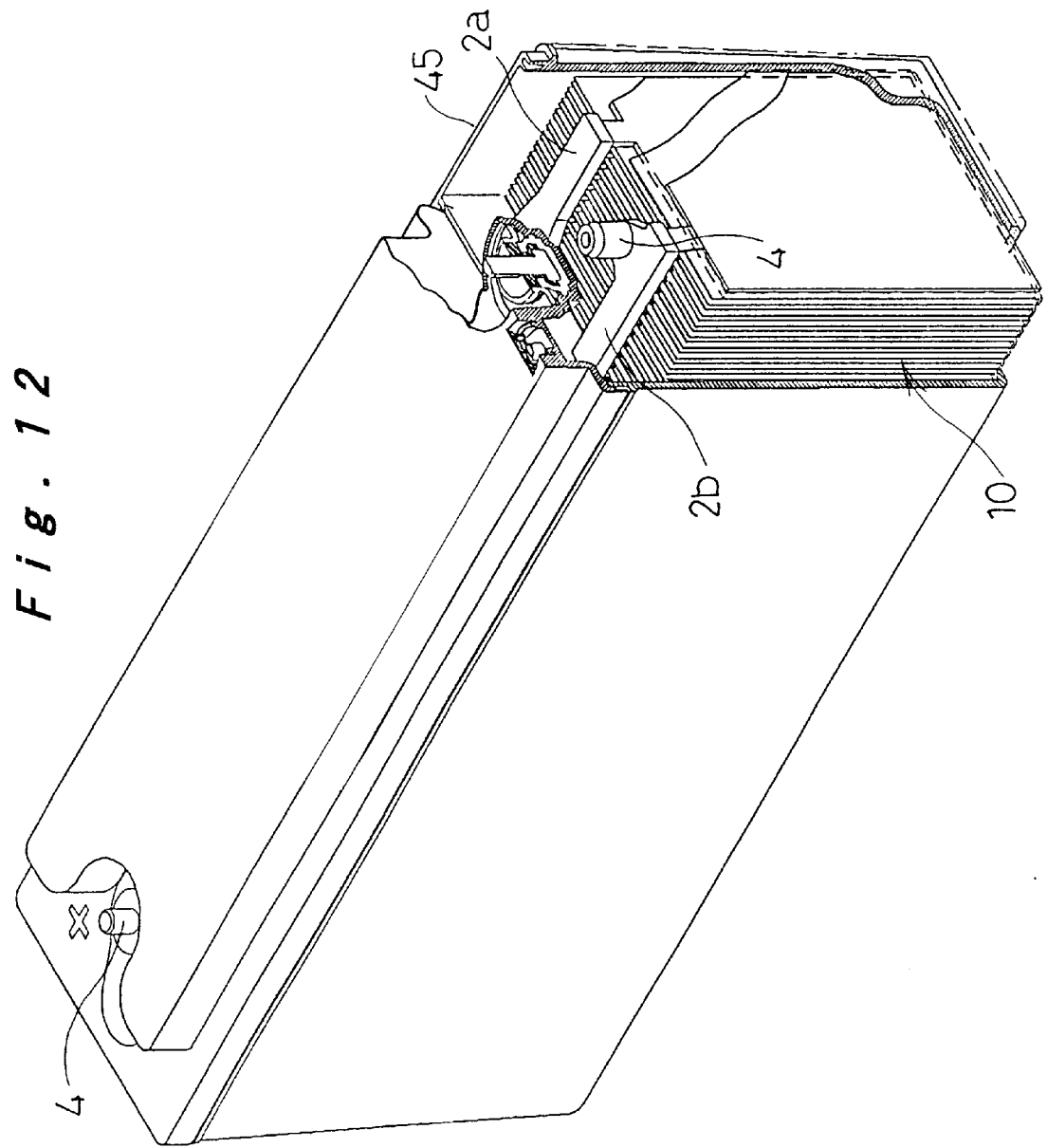
FIG. 12 is a perspective view showing an example of a lead accumulator constructed by assembling electrode plate assemblies.

In contrast, in the prior art construction shown in FIG. 10B, the temperature of the molten lead must be kept high at more than 500° C. in anticipation of the drop in temperature on insertion of electrode plate leads 6, so the production of lead oxide, so-called scum, is unavoidable, resulting in fusion being effected with molten lead admixed with impurities. Also, since the molten lead is poured into a mold 43 of low temperature and this is followed by insertion of electrode plate leads 6, the steep drop in the temperature of the molten lead is continued. As a result, melting of electrode plate leads 6 is unstable and there is a considerable risk of producing poor welds.

Although the various steps of manufacturing an electrode plate assembly described above were arranged along a circumferential track, it would also be possible to adopt an arrangement in which these were arranged along a straight line, the strap-forming metal molds 12 and electrode plate groups 10 being fed along the production line.

While a preferred embodiment of the invention has been described using specific terms, such description is for illustrative purposes only, and it is to be understood that changes and variations may be made without departing from the spirit or scope of the following claims.

What is claimed is:

1. A device for manufacturing an electrode plate assembly for a lead accumulator wherein an electrode plate group is formed by alternately stacking, with interposition of separators, a plurality of electrode plates of both positive and negative electrodes, a positive electrode row and negative electrode row respectively of electrode plate leads formed in projecting manner on each electrode plate being inserted in molten lead that is poured into a mold of strap shape, so that the electrode plate leads are fused with the molten lead, an electrode plate assembly then being manufactured by unitarily linking and joining the rows of electrode plate leads of respective positive and negative electrodes by means of a strap formed by the molten lead solidified by cooling the mold, comprising:

a strap-forming metal mold including downwardly directed cooling fins at a bottom face of said mold;

an electromagnetic induction coil and a cooling device, for respectively heating and cooling said strap-forming mold, said cooling device being arranged in a region surrounded by said cooling fins, and said electromagnetic induction coil being arranged at a periphery of the mold outside of the cooling fins;

a mechanism for raising and lowering the electrode plate group that effects raising and lowering movement over the strap-forming metal mold, holding said electrode plate group;

a circulatory drive mechanism wherein said strap-forming metal mold and said mechanism for raising and lowering the electrode plate group are arranged along a circumferential track, being mounted in a number corresponding to a number of steps for forming the strap on said electrode plate group, and the strap-forming metal mold and the mechanism for raising and lowering the electrode plate group being circulated in forward-feed manner to each step; and a control that controls the induction heating by said electromagnetic induction coil and cooling by cooling device in accordance with temperature detection of said mold and that controls the action of said circulatory drive mechanism and various devices in each step.

2. The device for manufacturing an electrode plate assembly for a lead accumulator according to claim 1, wherein the cooling device includes a shower nozzle that disperses and sprays cooling water onto the mold and the cooling fins formed on the mold.

3. The device for manufacturing an electrode plate assembly for a lead accumulator according to claim 1, wherein at least the inside face of the mold is covered by material of good thermal conductivity, the mold being formed in thin shape by metallic material of large skin effect produced by electromagnetic induction.

4. The device for manufacturing an electrode plate assembly for a lead accumulator according to claim 1 wherein, the mold includes a laminated structure of 430 stainless steel and a material of good thermal conductivity.

5. The device for manufacturing an electrode plate assembly for a lead accumulator according to claim 1, further comprising a radio frequency power source for each strap-forming metal mold that supplies induction heating power to the electromagnetic induction coil.

6. The device for manufacturing an electrode plate assembly for a lead accumulator according to claim 1, further comprising a temperature sensor disposed in the strap-forming mold, wherein radio frequency power that is supplied to the electromagnetic induction coil being controlled in accordance with a detection value of said temperature sensor.

7. The device for manufacturing an electrode plate assembly for a lead accumulator according to claim 1, further comprising means for auxiliary heating that effects auxiliary heating of the mold prior to pouring in of the molten lead into the mold.

8. The device for manufacturing an electrode plate assembly for a lead accumulator according to claim 7, wherein the means for auxiliary heating includes an electromagnetic induction coil for auxiliary heating that is arranged in the vicinity of the mold prior to pouring of the molten lead into the mold.

9. The device for manufacturing an electrode plate assembly for a lead accumulator according to claim 7, wherein the means for auxiliary heating includes a burner that is arranged in the vicinity of the mold prior to pouring of molten lead into the mold.

10. The device for manufacturing an electrode plate assembly for a lead accumulator according to claim 7, wherein the means for auxiliary heating is a heating device that is arranged in the vicinity of the mold prior to pouring of molten lead into the mold.

* * * * *